US008311532B2

(12) United States Patent
Waller

(10) Patent No.: US 8,311,532 B2
(45) Date of Patent: Nov. 13, 2012

(54) METHOD AND SYSTEM FOR ENABLING PERSONALIZED SHARED MOBILE PHONE USAGE

(75) Inventor: Nigel Waller, London (GB)

(73) Assignee: Movirtu Limited, London (GB)

( * ) Notice: Subject to any disclaimer, the term of this patent is extended or adjusted under 35 U.S.C. 154(b) by 704 days.

(21) Appl. No.: 12/214,902

(22) Filed: Mar. 4, 2008

(65) Prior Publication Data
US 2009/0227229 A1    Sep. 10, 2009

(51) Int. Cl.
H04M 3/00 (2006.01)
(52) U.S. Cl. ............. 455/420; 455/426.1; 455/425; 455/406; 455/407; 455/411
(58) Field of Classification Search ......... 455/432.1, 455/432.2, 558, 406, 420
See application file for complete search history.

(56) References Cited

U.S. PATENT DOCUMENTS 7,218,915 B2 * 5/2007 Craven .................... 455/411
7,702,331 B2 * 4/2010 Zabawskyj et al. ....... 455/432.1
2004/0142684 A1 * 7/2004 Ratert et al. ............. 455/420
2008/0268812 A1 * 10/2008 Meincke .................. 455/406
2012/0157040 A1 * 6/2012 Naito et al. .............. 455/406

* cited by examiner

Primary Examiner — Olumide T Ajibade Akonai
Assistant Examiner — Randy Peaches
(74) Attorney, Agent, or Firm — Steptoe & Johnson LLP

(57) ABSTRACT

Disclosed is a system and method for enabling personalized shared mobile phone usage within a wireless telecommunications network, including an illustrative application of the invention as it relates to mobile subscribers who cannot afford a mobile phone handset in the emerging markets. For instance, a prepaid wireless subscriber can be provisioned on a wireless network without the need for a mobile phone handset or SIM but with a personal phone number. The subscriber may access his account and invoke the system by keying in an Unstructured Supplementary Service Data (USSD) short code followed by his account number on a borrowed handset to access a personalized menu sent from the system over the network. Key features of the disclosure are the very low cost of entry and the ability for a subscriber to access the system from any GSM MAP2+ handsets without the need for any modification or downloading of applications.

14 Claims, 2 Drawing Sheets

METHOD AND SYSTEM FOR ENABLING PERSONALIZED SHARED MOBILE PHONE USAGE

STATEMENT REGARDING FEDERALLY SPONSORED RESEARCH OR DEVELOPMENT

Not Applicable.

US PATENT DOCUMENTS RERERENCED

Application Ser. No. 12/033,012, Unstructured Supplementary Service Data Call Control Manager, Dorron Mottes, Assignee: Vascode Technologies Ltd., Filing date: Feb. 18, 2008

Application Ser. No. 11/531,865, Circuit Bearer Control, Simon Brueckheimer et al, Filing date: Sep. 14, 2006

Application Ser. No. 11/395,236, Method and system for international roaming and call bridging, Zabawskyj, et al., Filing date: Apr. 3, 2006

Application Ser. No. 11/211,750, Shared phone, medium having recorded therein program for . . . , Katsuaki Akama, Filing date: Aug. 25, 2005

Application Ser. No. 11/205,976, Method and device for providing mobile services with virtual, Tae-Hyo Ahn, Hoon-Bae Kim, Ki-Chul Park, Assignees: KTFREETEL Co., Ltd., Filing date: Aug. 17, 2005

Application Ser. No. 10/918,644, Multiple IMSI multiple/single MSISDN (MIMM/MISM) on multiple SIMs, Yue Jun Jiang, Filing date: Aug. 13, 2004

Application Ser. No. 10/438,097, Method and system allowing for one mobile phone number (MSISDN) to be . . . , Bohdan Konstantyn Zabawskyj et al, Filing date: May 15, 2003

U.S. Pat. No. 7,330,725, Method and system for international roaming and call bridging, Bohdan K. Zabawskyj et al, Assignee: Redknee Inc., Issue date: Feb. 12, 2008

U.S. Pat. No. 7,295,659, Method and system for prepaid communications credit, John Ruckart et al, Assignees: AT&T BLS Intellectual Property, Inc., Issued date: Nov. 13, 2007

U.S. Pat. No. 7,181,210, Method and system for international roaming and call bridging, Bohdan Konstanjyn Zabawskyj et al, Assignee: Redknee Inc., Issue date: Feb. 20, 2007

U.S. Pat. No. 7,164,927, Telecommunication method and suitable system for establishing a . . . , Michael Koch et al, Assignee: Swisscom Mobile AG, Issue date: Jan. 16, 2007

U.S. Pat. No. 6,975,852, System and method for roaming for prepaid mobile telephone service, Sofer, et al., Assignee: StarHome GmbH, Issued date: Dec. 13, 2005

U.S. Pat. No. 6,961,412, Method and system for prepaid communications credit, John Ruckart, Rimas Rauba, Jerome Wendell Myers, Assignee: BellSouth Intellectual Property Corporation, Issued date: Nov. 1, 2005

U.S. Pat. No. 6,876,860, Method for implementing a call-back service in a mobile radio network, Andreas Berg, Klaus Moneke, Bart Van Ballaer, Assignee: Siemens Aktiengesellschaft, Issued date: Apr. 5, 2005

U.S. Pat. No. 6,792,261, Mobile collect call system and method, Lipa Ogman et al, Issue date: Sep. 14, 2004

U.S. Pat. No. 6,757,266, Communication system method for setting up connections between terminals of . . . , Frank Hundscheidt, Assignee: Telfonaktiebolaget LM Ericsson (pubi), Issue date: Jun. 29, 2004

BACKGROUND OF THE INVENTION

Simple low cost access to mobile phones has huge economic and social impacts; research from GSM Association has showed that an increase of just 10% of mobile penetration in a developing country will raise the economic growth rate by 1.2%. Industrial companies have been striving to develop low cost mobile handsets below $30 per unit, however the cost is still beyond much of the world's 6.3 bn population. According to a recent Nokia Study more than 50% of respondents in India and Pakistan and nearly 30% of respondents in Vietnam said they share, or would share, their mobile phone with family or friends. More and more families in the emerging markets are also purchasing mobile phones for pooled or shared usage with a family unit, or amongst a group of friends. However the shortcomings in the use of shared phones are that the individual subscriber does not have his own individual number to enable him to receive calls, or voice messages; that he has to carry on paper his own contact database and that all his call records remain on the shared phone he has used.

The use of USSD in GSM mobile networks is defined in 3GPP/ETSI GSM 02.90 (USSD Stage 1) and GSM 03.90 (USSD Stage 2) specifications. USSD works on all existing GSM MAP2+ handsets which is almost all existing handsets, with no handset or SIM card upgrade necessary. The potential of the pre-installed user base for USSD applications is therefore immense. It is a session orientated service, unlike SMS which is store and forward, which allows very fast communication between a handset and an application. Users do not need to access any particular handset menu to access services with USSD, they enter a defined USSD string from the handset, such as *#101#, to access a particular operator predefined service. USSD codes are routed back to the home mobile's network HLR and then onto the MSC and ultimately to the USSD gateway. The gateway will respond to the code in a predefined way.

The use of USSD to access information services, or to enable roaming on a prepaid account, or to manage prepaid accounts by doing a balance enquiry or credit recharge from a voucher is well detailed in industry related literature and know-how. For example, U.S. patent application Ser. No. 11/225,636 by Zabawskyj, et al. Entitled Method and system for international roaming and call bridging and U.S. Pat. No. 6,975,852 by Sofer, et al. Entitled System and method for roaming for prepaid mobile telephone service. However the use of USSD to enable personalised shared mobile phone usage is innovative.

BRIEF SUMMARY OF THE INVENTION

The method and system for personalised shared mobile phone usage disclosed herein is an innovative network application, enabling subscribers who cannot afford a mobile phone handset to share a mobile handset and allow them make phone calls using their own prepaid account, allow them access to a personalised address book of contacts and voicemail messages without the need for their own handset or SIM card.

The subscriber approaches the owner of a handset and negotiates to borrow or share the handset. Upon agreement the owner of the handset would first key in a USSD string to activate the shared mode and temporarily disable his account on the network. Typically the USSD string would be promoted by the network operator and would common across the network. Once the USSD string is received by the system server, the server would interact with the MSC to disable the billing of services to the handset owner's account. This would require the network operator to have within his network a real time billing and service provisioning system. The handset would effectively be in a dormant mode and would be waiting for the user to enter the USSD string to access the shared phone service. The owner of the handset would then pass the phone to the subscriber.

The subscriber would enter the access USSD string for the shared phone application, followed by his personal phone number. The USSD gateway would receive this request and pass it onto the system server. The system server would authenticate the user and would enquire with the MSC and the prepaid billing system the status of the user's account. Once authenticated, the subscriber can see on the handset a personalised USSD menu. The contents of the USSD menu would be generated by the system server and would be sent using the network USSD browser and USSD gateway infrastructure. The menu could be sent in any international language as long as it uses the standard international character set.

Some of the options available to the subscriber would include information on the account status and prepaid account balance; the ability to top up the account with a prepaid top-up card voucher code; access to a personalised address book of contacts; access to personal voicemail messages and account setting such as choice of language. The later is very important since most standard handsets only support a few major languages and typically require additional downloads of language packs to localise the handset. In this invention the user would always have access to his local language whatever the setting on the borrowed or shared handset.

The subscriber would be able to make calls to a number he enters directly into the phone or to his contacts. The number would be passed to the MSC and the call set up as in a standard network call, expect that the said subscriber's virtual prepaid account would be decremented in real-time. The original owner of the handset would not be charged for the call. Another benefit of the invention is that the subscriber could, if he wishes, show his CLI during the call instead of the call showing the CLI of the borrowed or shared handset. Thus it would appear to the subscriber receiving the phone call that the subscriber has his own personal telephone number and account.

Since the subscriber will have CLI, he also use services such as Missed Call Alert (MCA) already on the network to send free or low cost messages to people. For example it is quite common for subscribers in developing markets to telephone a number, let the number ring a small number of times, and then drop the call to have the network issue a free of charge or low cost MCA message to the number called. This simple MCA alert may be a simple prearranged messaged to indicate for example "I arrive home safely", or "everything is fine". Without a CLI such techniques are unusable.

Once the subscriber has completed his calls, he exits the system by choosing the appropriate option on the USSD menu. Another benefit of using USSD for this invention is that no historical data or record of the session would be stored on the handset. Once the USSD session is closed, the phone stores no memory of the session ensuring privacy of passwords, and phone usage.

The alternative method shown in this invention is suitable for network operators that do not have installed in their network the necessary real time billing and provisions systems that can disable the account of the owner of the handset. The alternative method is to utilise a USSD phone back service where the subscriber would enter the number to be called into the USSD menu. Thus number would be passed to the system server via the USSD gateway and the server would set up two phone calls, one to the original handset and one to the phone number entered by the subscriber. The system would then bridge these two calls similar to a conference call. Neither of the two calls would be charged to the owner of the handset's account and both calls would be charge to the subscriber's prepaid account.

Key features of the disclosure is the very low cost of entry to the subscriber and the mobile operator, the ability for a subscriber to access the system from any GSM MAP2+ handsets without the need for any modification or downloading of applications to the handset, the ability to support multiple languages, the ability for the subscriber to access a personalised environment on a shared phone, the option for the subscriber to access a personalised voicemail service, the ability for the user to receive calls on his number, the ability for the system to work even when roaming, the option for the caller to be able to show their own CLI and not that of the borrowed or shared handset, the fact that by having a personal CLI the subscriber can use services such as Missed Call Alert (MCA) to send free or low cost information alerts to other people and the fact that once the access session to the system is closed no history or any data remains on the handset.

Although the method and system disclosed, by and large employs a series of general purpose network equipment, databases, and systems such as billing systems to achieve its ends, the bona fide distinctiveness of the invention resides in the setup and management of the remote environment the user experiences which is established by the system server and it is this server which principally incorporates much of the functional and operative aspects of the invention.

Aside from USSD, a variety of other mechanisms may be utilised by a subscriber to access the system. These messaging mechanisms may include, but are by no means bounded by, Short Message Service (SMS), Internet browser using WAP, Internet Browser using HTTP, or a voice-based call using Dual-Tone-Multi-Frequency (DTMF) Interactive Voices Response based technologies. Alternatively the system could be initiated from a SIM-toolkit application resident on the SIM card of the handset.

The system messages may be routed directly via existing telephony protocols or may be routed indirectly via a messaging gateway. The information provided via the messaging mechanism will typically include the identity of the originating subscriber and the service to be activated.

BRIEF DESCRIPTION OF THE DRAWINGS

The foregoing summary of the invention, as well as the following detailed description of the preferred embodiment, is better understood when read in conjunction with the accompanying drawings, which are included by way of example, and not by way of limitation with regard to the claimed invention:

DETAILED DESCRIPTION OF THE PRESENTLY PREFERRED EMBODIMENT

Figure 1:
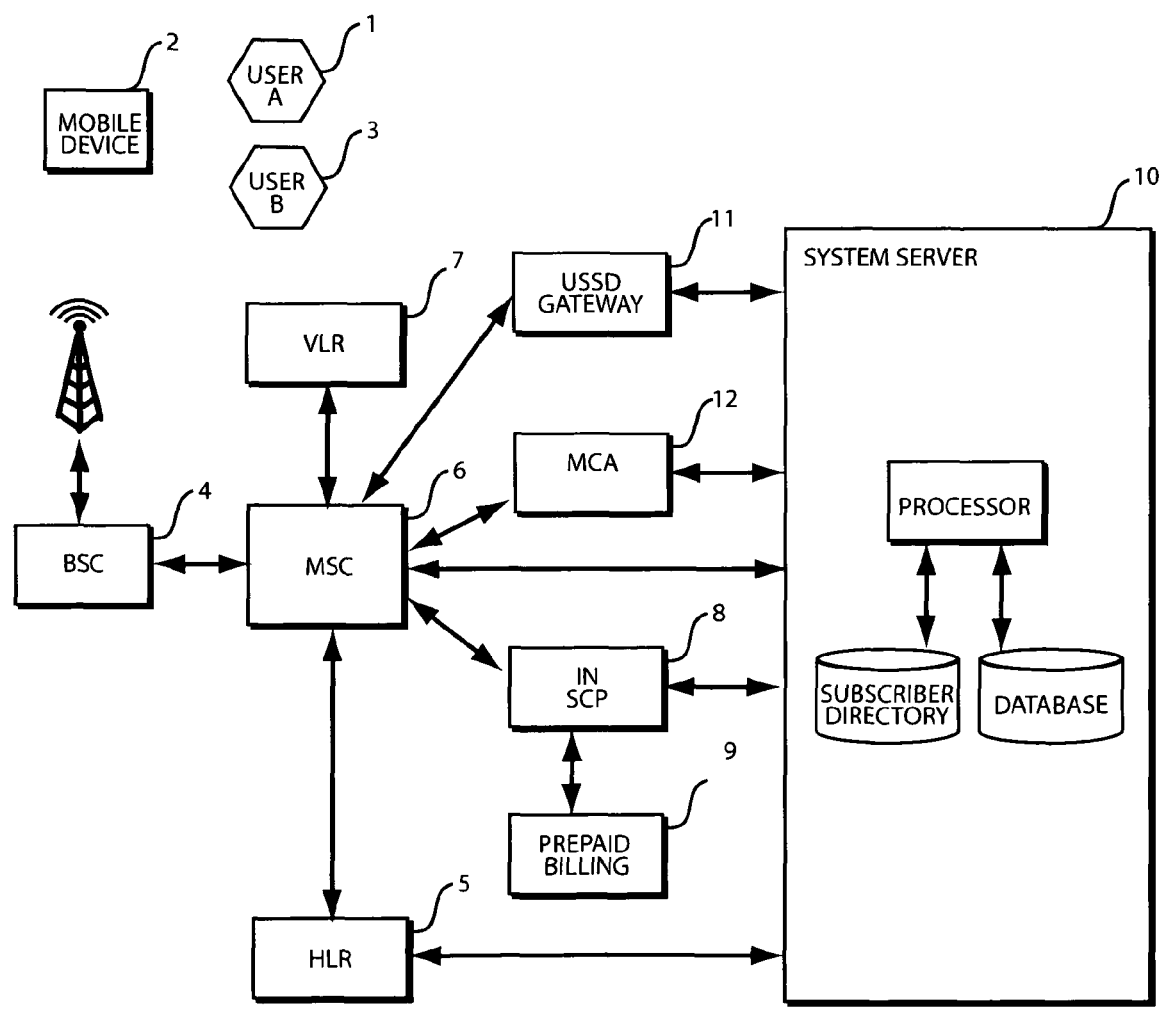
FIG. 1. Is an exemplary architecture of a wireless telecommunications network for processing calls and a system server in accordance with the present invention.

In FIG. 1. User A 1 owns Mobile Device 2 and inside the mobile device is a personal SIM (Subscriber Identity Module) Card supplied by the network operator. The SIM card uniquely identifies the subscriber using an IMSI (International Mobile Subscriber Identity) and their mobile phone number the MSISDN (Mobile subscribers integrated services digital network) and allows the Mobile Device 2 to be registered and authenticated on the network. The Mobile Device 2 itself is identified by an IMEI (International Mobile Equipment Identity), which can be obtained by the network upon request. Telephony calls, and other services used by the device, are billed to the account holder of the SIM Card.

The Home Location Register (HLR) 5 is a database which stores data about the subscribers, including the Authentication Key (Ki) for each SIM. The Mobile Services Switching Center (MSC) 6 is the network element which performs the telephony switching functions of the network. The MSC is responsible for network interfacing and common channel signalling. The Visitor Location Register (VLR) 7 is a database which stores temporary information about roaming subscribers. Base Station Controller (BSC) 4 is the network element which provides all the control functions and physical links between the MSC and the radio interface. The BSC provides functions such as handover, cell configuration data, and control of radio frequency power levels.

Figure 2:
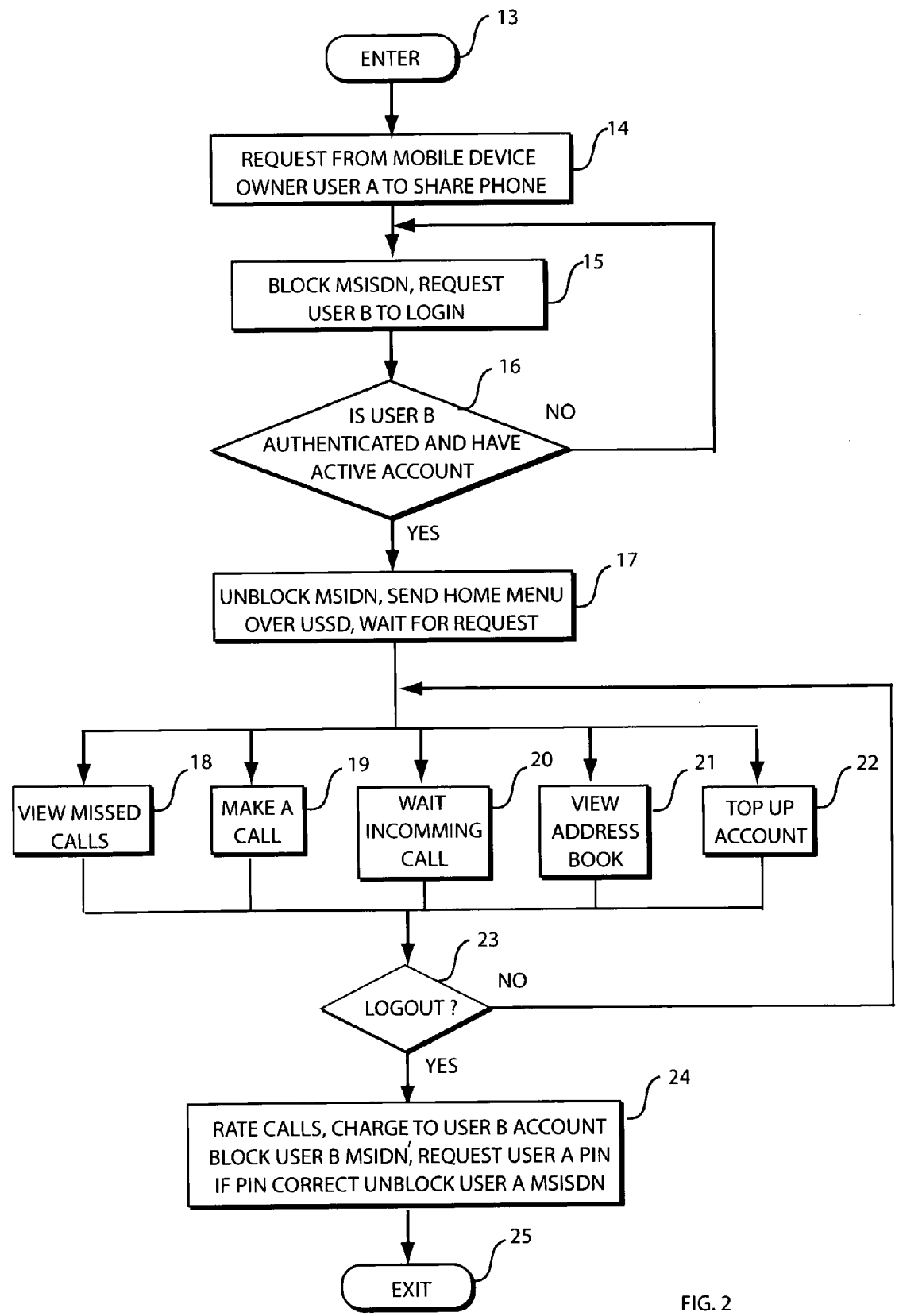
FIG. 2. Is a flowchart depicting the operation of the shared access feature according to one embodiment of the present invention.

The subscriber User B in FIG. 2. may access his account and invoke the system by keying in an Unstructured Supplementary Service Data (USSD) short code followed by his account number on a borrowed or shared handset 2 from User A. The owner of the borrowed or shared handset would first key in a USSD string to activate the shared mode and temporarily disable his account on the network. He would then pass the handset to the subscriber to allow them to enter a USSD string comprising the access code for the service and their personal phone number.

Once authenticated by the system server 10, the subscriber can see on the handset a personalised USSD menu sent from the system server 10 over the telecommunications network to the handset, which allows him access to a personalised address book of contacts, his voicemail messages and administration of his personal prepaid account balance. The subscriber can make calls by entering a number directly, or to his contacts and the said subscriber's prepaid account is decremented in real-time. Once the subscriber has completed his calls, he exits the system by choosing the appropriate option on the USSD menu.

While the foregoing describes what are considered to be the preferred embodiments of the invention, it is understood that various modifications may be made therein and that the invention may be implemented in various forms and alternate embodiments, and indeed that it may be applied in numerous applications, only some of which have been described. The claims are intended to cover all such modifications and variations which fall within the true scope of the invention.

The invention claimed is:

1. A method for enabling shared mobile phone usage on a telecommunications network, the method comprising:
    receiving a request at a wireless telecommunications network to enter a shared mode, wherein the request is received from a shared mobile phone comprising a Subscriber Identity Module (SIM), wherein the SIM is associated with a first account of a first user;
    transmitting a request for an access string from the wireless telecommunications network to the shared mobile phone;
    receiving and authenticating the access string with the wireless telecommunication network, wherein the access string is associated with a second account of a second user; and
    enabling billing to the second account of the second user for charges incurred by usage of the shared mobile phone while in the shared mode and while using the SIM associated with the first account of the first user.

2. The method of claim 1, further comprising disabling billing to the first account for charges incurred by usage of the shared mobile phone while in the shared mode.

3. The method of claim 1, further comprising transmitting a Caller Line Identity (CLI) during usage of the shared mobile phone while in the shared mode, wherein the CLI is associated with the second account.

4. The method of claim 1, further comprising transmitting an address book of contacts to the shared mobile phone while in the shared mode, wherein the address book of contacts is associated with the second account.

5. The method of claim 1, further comprising transmitting voicemail messages to the shared mobile phone while in the shared mode, wherein the voicemail messages are associated with the second account.

6. The method of claim 1, further comprising transmitting a request for a choice of language to the shared mobile phone.

7. The method of claim 1, further comprising transmitting account balance information to the shared mobile phone while in the shared mode, wherein the account balance information is associated with the second account.

8. The method of claim 1, further comprising billing the second account in real-time while in the shared mode.

9. The method of claim 1, wherein the request to enter the shared mode is received via unstructured supplementary service data, short message service, stream control transmission protocol, dual-tone-multi-frequency, wireless application protocol, hypertext transfer protocol, SIGTRAN, or a SIM-toolkit application.

10. The method of claim 1, wherein the access string is transmitted via unstructured supplementary service data, short message service, stream control transmission protocol, dual-tone-multi-frequency, wireless application protocol, hypertext transfer protocol, SIGTRAN, or a SIM-toolkit application.

11. The method of claim 1, wherein the second account comprises a prepaid account or a postpaid account.

12. The method of claim 1, wherein the access string comprises an access code and a personal phone number associated with the second account.

13. The method of claim 1, wherein the request to enter the shared mode is received via unstructured supplementary service data.

14. The method of claim 1, wherein the access string is transmitted via unstructured supplementary service data.

* * * * *